US006648354B2

(12) United States Patent
James

(10) Patent No.: US 6,648,354 B2
(45) Date of Patent: Nov. 18, 2003

(54) LEG-PROPELLED WHEELCHAIR

(75) Inventor: Kelvin B. James, Edmonton (CA)

(73) Assignee: Biomotion Ltd., Edmonton (CA)

( * ) Notice: Subject to any disclaimer, the term of this patent is extended or adjusted under 35 U.S.C. 154(b) by 0 days.

(21) Appl. No.: 10/062,815

(22) Filed: Jan. 30, 2002

(65) Prior Publication Data

US 2002/0101054 A1 Aug. 1, 2002

Related U.S. Application Data

(60) Provisional application No. 60/265,687, filed on Jan. 31, 2001.

(51) Int. Cl.[7] ............................................ B62M 1/04
(52) U.S. Cl. ................................ 280/255; 280/250.1
(58) Field of Search ......................... 280/250.1, 304.1, 280/252, 253, 255

(56) References Cited

U.S. PATENT DOCUMENTS

| | | | |
|---|---|---|---|
| 3,666,292 A | 5/1972 | Bartos | |
| 3,994,509 A | 11/1976 | Schaeffer | |
| 4,421,336 A | 12/1983 | Petrofsky et al. | |
| 4,486,048 A | 12/1984 | Meyer | |
| 4,523,769 A | 6/1985 | Glaser et al. | |
| 4,583,754 A | 4/1986 | Seeliger | |
| 4,586,723 A | 5/1986 | Nabinger | |
| 4,766,772 A | 8/1988 | Tsuchie | |
| 5,020,815 A | 6/1991 | Harris et al. | |
| 5,033,793 A | 7/1991 | Quintile | |
| 5,632,499 A | 5/1997 | Hutcherson et al. | |
| 6,196,565 B1 * | 3/2001 | Chubbuck | 280/255 |
| 6,220,615 B1 * | 4/2001 | Chubbuck | 280/304.1 |
| 6,247,715 B1 | 6/2001 | Korosue | |

* cited by examiner

*Primary Examiner*—Kevin Hurley
(74) *Attorney, Agent, or Firm*—Sheridan Ross PC

(57) ABSTRACT

The wheelchair incorporates a telescoping pivoting input lever. At its lower end, the lever carries a footrest for securement to the user's feet. At its upper end, the lever is connected to a horizontal shaft rotatably mounted to the wheelchair frame, at an elevation below the top surface of the seat. The user pivots his lower legs about the knee joints to produce an oscillating pivoting motion. A drive assembly, incorporating the shaft, engages the lever with a rear wheel of the wheelchair. The drive assembly functions to convert the oscillating pivoting motion to forward rotational motion and to transmit this motion to the wheel to drive it. The telescopic nature of the lever enables the user's knees to remain stationary. Means are provided to regulate the length of the lever so that the footrest supports the lower legs. Means are also provided for manually engaging or disengaging the drive assembly so that the user can put the wheels into free-wheeling mode, when desired. The assembly is intended to enable the user to exercise the leg muscles in the course of propelling the wheelchair.

6 Claims, 17 Drawing Sheets

LEG-PROPELLED WHEELCHAIR

CROSS-REFERENCE TO RELATED APPLICATIONS

Priority is claimed from U.S. Provisional Patent Application No. 60/265,687 filed Jan. 31, 2001, entitled "SYSTEM FOR USING LEG MOVEMENTS TO PROPEL A WHEELCHAIR," which is incorporated by reference in its entirety.

FIELD OF THE INVENTION

The invention relates to a wheelchair modified for propelling by a pivoting action of the user's lower legs about the knee joints.

BACKGROUND OF THE INVENTION

Wheelchairs are commonly in use by people having weakness in their legs or balance problems. The present invention is concerned with providing a wheelchair which the user can propel by pivoting his lower legs about the knee joints, to thereby exercise his leg muscles.

The conventional wheelchair comprises:

a frame supporting a seat;

a pair of free-wheeling large drive wheels rotatably mounted to the rear end of the frame;

one or more free-wheeling, pivoting caster wheels mounted to the front end of the frame;

a footrest extending down from the front of the frame, for supporting the lower legs; and circular push rims projecting outwardly from the rear wheels.

The user grasps the push rims with his hands and propels the wheelchair forward or backwards using his arms and upper body. Pushing of the left and right push rims at different intensities or in different directions allows the chair to gradually turn or to "pivot on the spot".

Propelling the wheelchair with the hands, arms and upper body can lead to overuse injuries due to the somewhat unnatural movements performed in driving the push rims. In addition, the lower legs get no exercise and the leg muscles can atrophy. As a result, bones in the legs may become weaker and this can lead to fractures.

A number of proposals have been made in the prior art with respect to modifying wheelchairs to address these problems.

One approach involves providing levers to be pushed or pulled by the arms to power the wheels. The two-direction oscillation of the push and pull strokes is converted to rotational motion through a lever system and then converted to a unidirectional rotational motion through the use of a ratchet and pawl or one-way clutch system, to power one or both of the rear wheels. However this approach still relies on the upper body strength of the user to power the movement of the chair. U.S. Pat. No. 3,994,509, issued to Schaeffer, is an example.

Other prior art devices have focussed on using the legs to power the chair. More particularly, U.S. Pat. No. 4,766,772, issued to Tsuchie, disclosed a pedaling assembly for rotating the wheels of a wheelchair. U.S. Pat. Nos. 4,421,336 issued to Petrofsky et al and 4,523,769, issued to Glaser et al, disclose an assembly utilizing back and forth sliding of the feet to propel the chair.

U.S. Pat. No. 4,486,048, issued to Mayer, discloses a pivoting footrest. U.S. Pat. No. 5,033,793, issued to Quintile, shows a telescoping footrest. U.S. Pat. No. 4,586,723, issued to Nabinger, shows a steering caster assembly.

SUMMARY OF THE INVENTION

It is an objective of the invention to modify a wheelchair so that pivoting of the user's lower legs about the knee joints, by extension and flexion of the knees, is used to propel the wheelchair.

In a preferred embodiment, the invention comprises:

a wheelchair having a frame, seat and front and rear wheels;

a horizontal shaft rotatably mounted to the front end of the frame at an elevation below that of the top surface of the seat;

a telescoping input lever pivotally connected at its upper end with the shaft at an elevation below the top surface of the seat and having a foot rest at its lower end, to which the user's feet are secured, whereby extension and flexion of the knees induces oscillating rotation of the shaft. The telescoping nature of the lever enables the axis of the knees to remain stationary, even though the pivot point of the lever is below that of the knee joints;

means for controlling the extent of telescoping of the input lever so as to ensure that the foot rest supports or bears at least part of the load of the legs and the lever;

drive assembly means, engaging the shaft with a rear wheel of the wheelchair, for converting the oscillating motion of the shaft into forward rotational motion and transmitting it to the wheel to drive it;

means, controllable by the user, for selectively engaging or disengaging the drive assembly means so that the wheels can freely rotate; and means, manually controllable by the user, for steering at least one front caster wheel to control the direction of the wheelchair's forward movement.

In one embodiment, there is provided a wheelchair having a frame pivotally connected with a telescoping input lever, that can be oscillated by extension and flexion of at least one of the user's knees. A drive assembly connects the input lever with a wheel of the wheelchair, for converting the oscillating motion of the lever into forward rotational motion and transmitting it to the wheel to drive it.

To the best of my knowledge, it is novel to propel a wheeled frame using a lower leg, pivoting at the knee, to actuate a pivoting input lever secured to the leg to thereby produce an oscillating pivoting motion that is then converted to a forward rotational motion which is transmitted to a drive wheel to move the assembly.

DESCRIPTION OF THE PREFERRED EMBODIMENT

Figure 1:
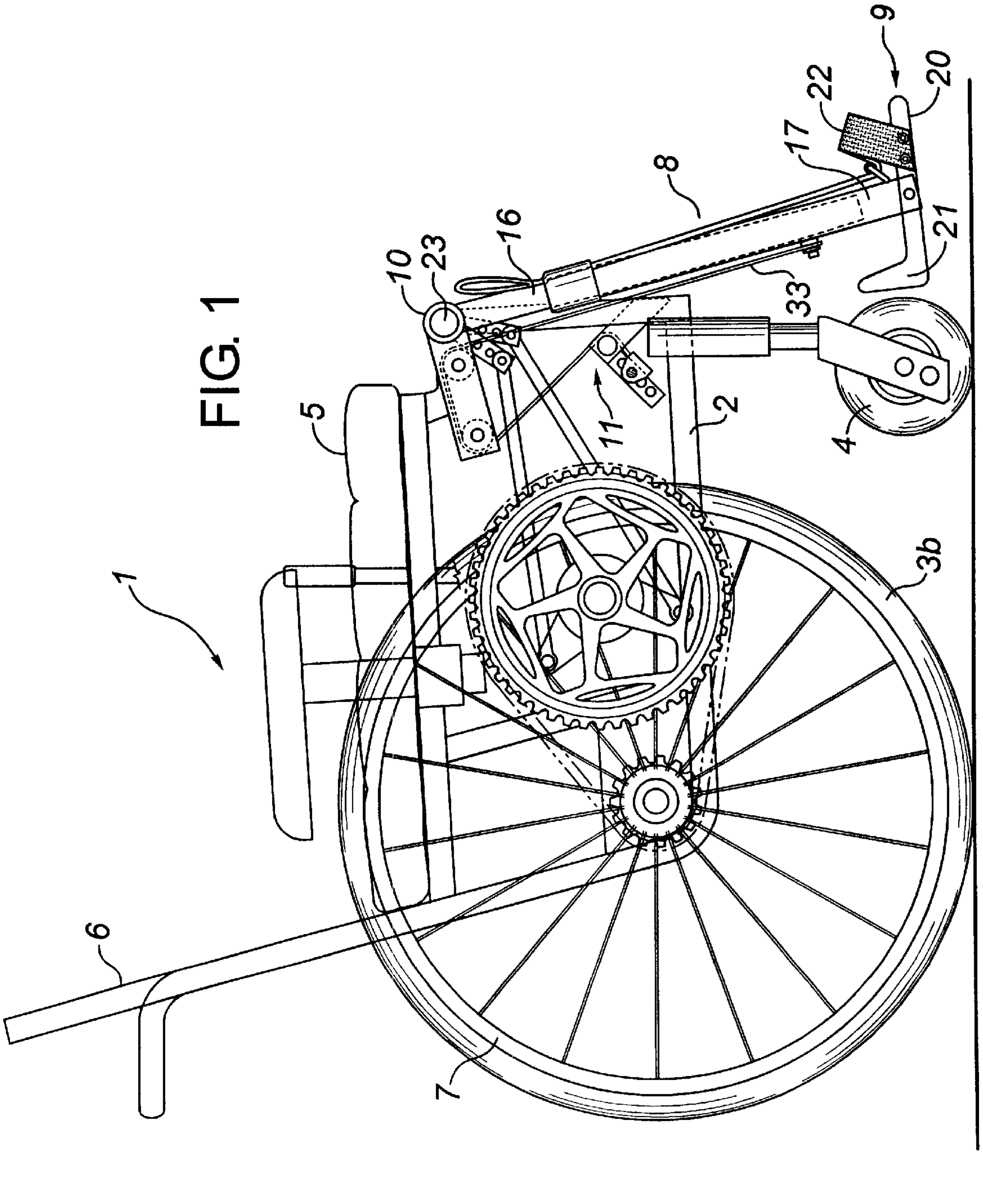
FIG. 1 is an elevation of a wheelchair incorporation the invention and viewed from one side, with some parts removed for simplification.
Figure 2:
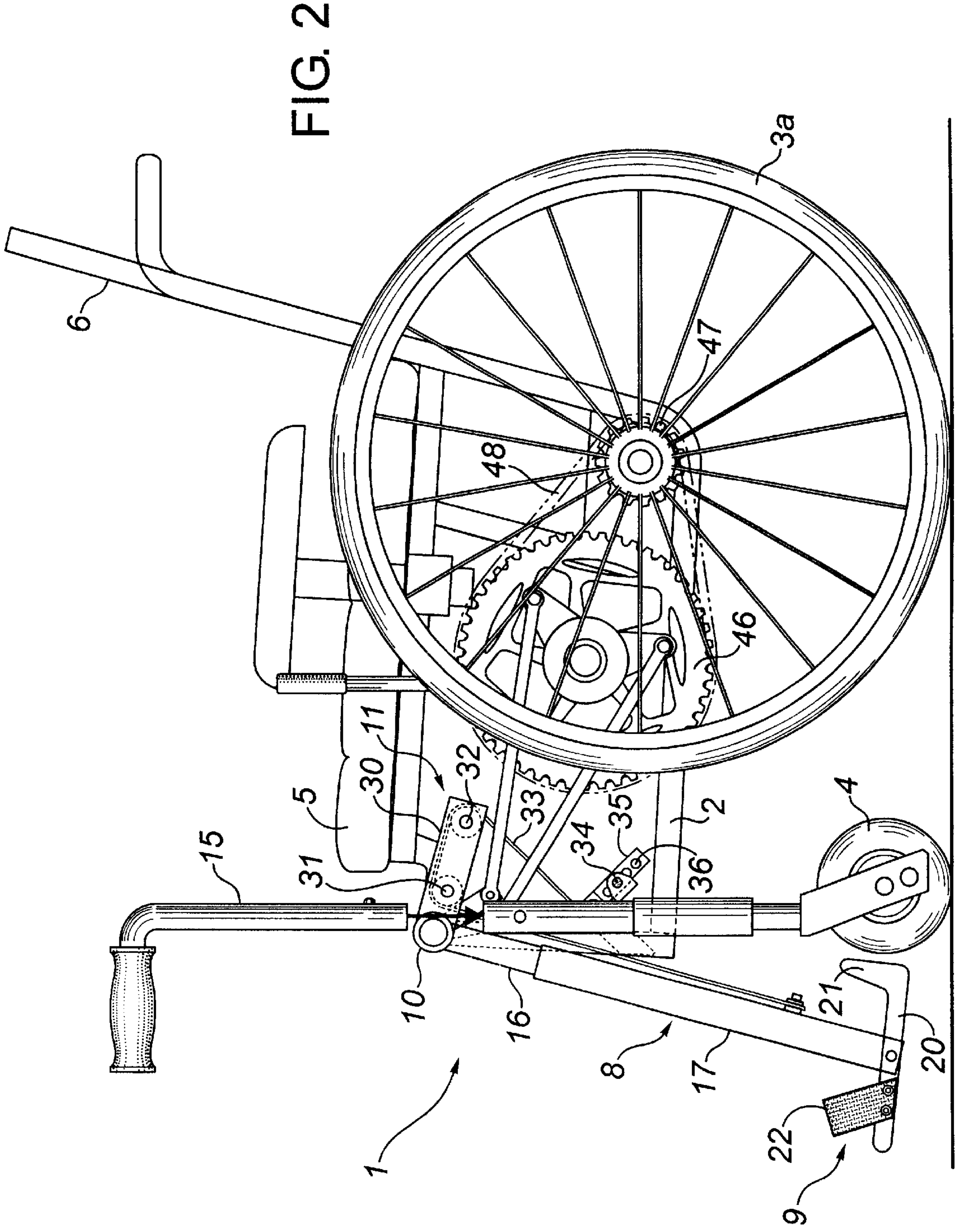
FIG. 2 is an elevation similar to that of FIG. 1, but viewed from the other side.

I have constructed the invention by starting with a commercially available wheelchair and modifying it. More particularly, I used a wheelchair I marketed under the trade-mark "ProSA" by Invacare Corporation, Elyria, Ohio. The wheelchair 1 comprises a frame 2 supported on rotatable rear wheels 3*a*, 3*b* and front caster wheels 4. The frame 2 carries a seat 5 and backrest 6. The rear wheels 3 have push rims 7 for manually propelling the wheelchair 1.

This wheelchair 1 has been modified in the following respects. A telescoping input lever 8, having a footrest 9 at its lower end, is connected at its upper end with a horizontal shaft 10. The shaft 10 is rotatably mounted to the front end of the frame 2. An extension control assembly 11, for regulating the extension and contraction of the input lever 8, is connected between the frame 2 and the lever 8. A drive assembly 12, incorporating the rotatable shaft 10, is connected between the input lever 8 and the axle shaft 13 of one of the rear wheels 3. The drive assembly 12 functions to convert the oscillating pivoting movement of the input lever 8 into forward rotation of the driven rear wheel 3*a*. A drive engagement assembly 14 is provided for manually engaging or disengaging the drive assembly 12 with the driven rear wheel 3*a*. And a steering assembly 15 is provided to steer one of the front caster wheels 4.

Figure 7:
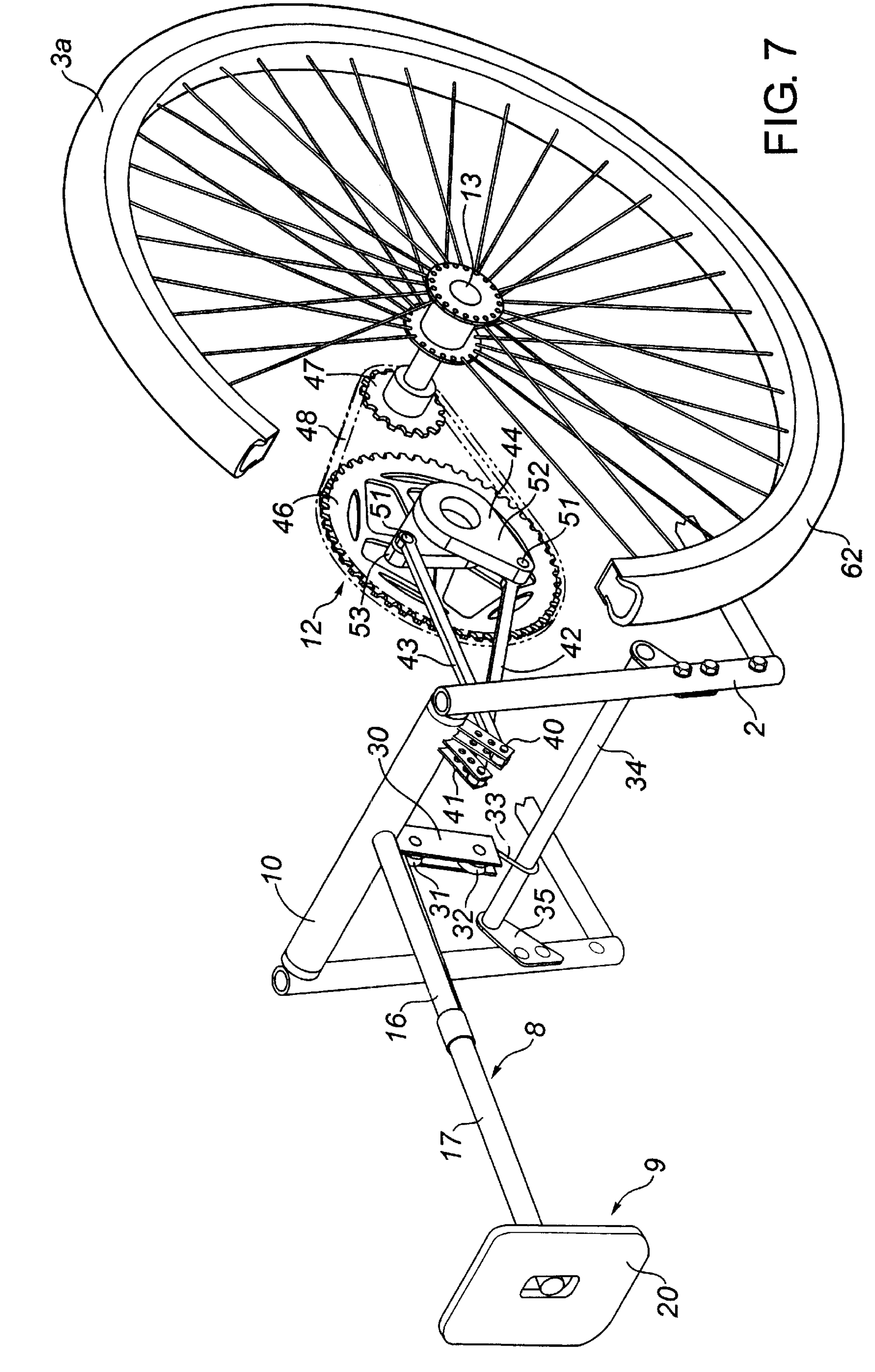
FIG. 7 is a view similar to FIG. 6, showing the components in the extended mode.

In greater detail, the input lever 8 comprises inner and outer tubes 16, 17. Linear ball bearings (not shown) are positioned in the annular space between the tubes 16, 17. The bearings facilitate telescoping movement of the tubes 16, 17 between the contracted position shown in FIG. 4 and the extended position shown in FIG. 7.

Figure 13:
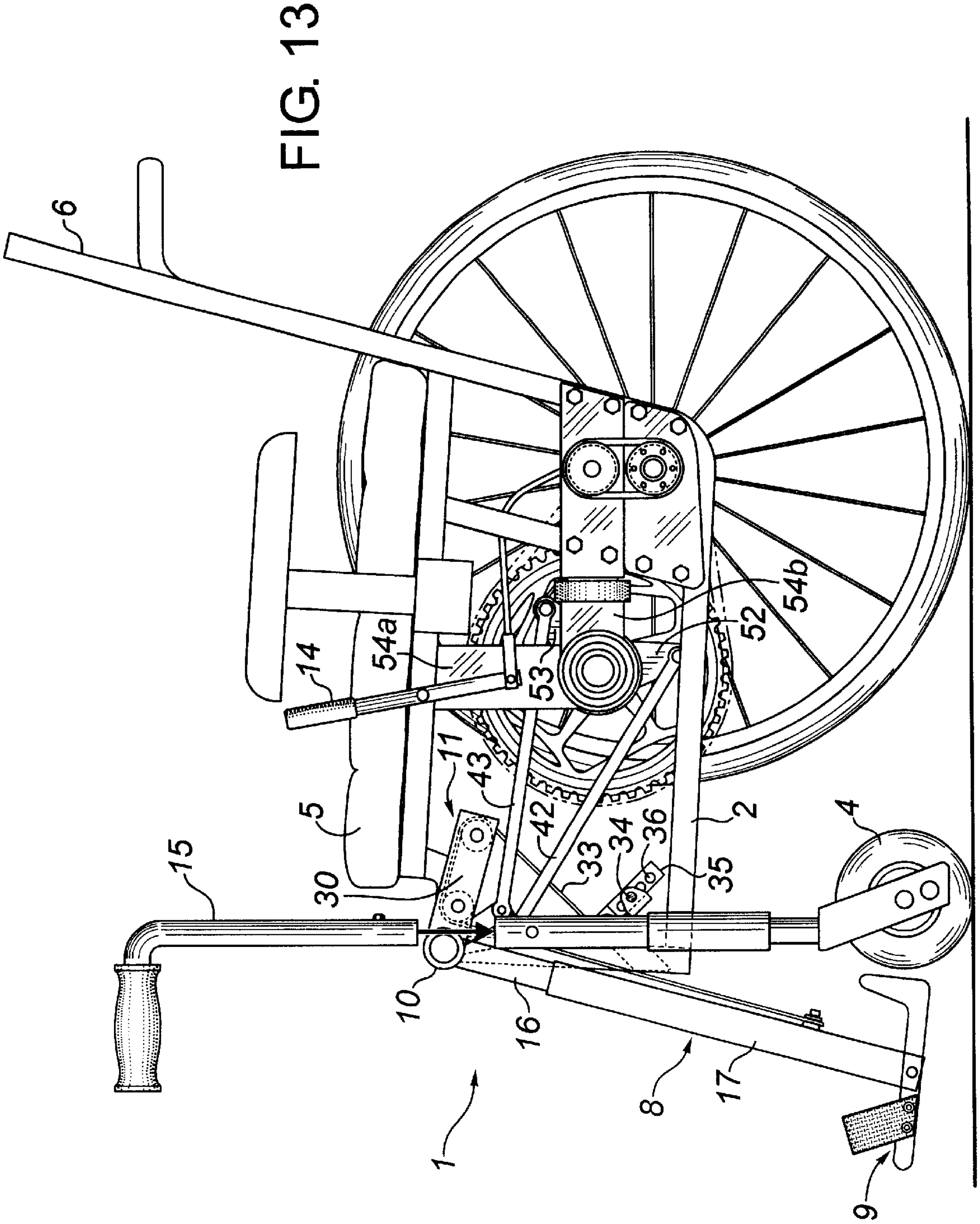
FIG. 13 is a side elevation of the wheelchair, showing the drive engagement assembly.

At its lower end, the input lever 8 carries a footrest 9. The footrest 9 comprises a plate 20, heel support 21 and toe strap 22. I add pull straps 22*a*, shown in FIG. 13, to combine with the heel support 21 and the toe strap 22 to firmly secure the user's feet to the plate 20.

At its upper end, the input lever 8 is connected to the horizontal shaft 10. The shaft 10 is rotatably mounted to the frame 2.

Figure 3:
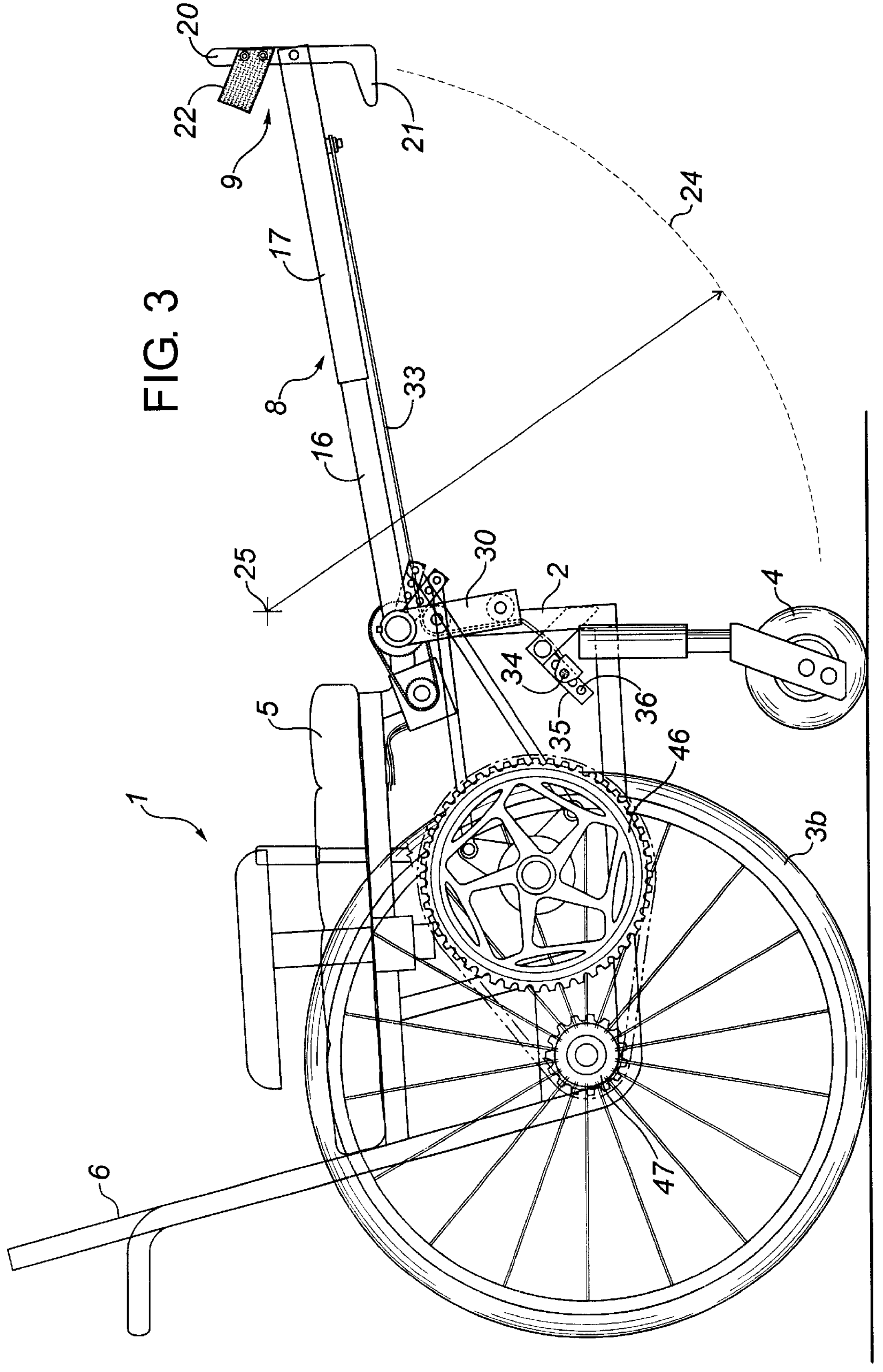
FIG. 3 is a side elevation of the wheelchair with the input lever extended.

The axis 23 of the shaft 10 is located at an elevation lower than that of the seat 5. As shown in FIG. 3, the shaft axis 23 is also below and just behind the axis 25 of the user's knees. This positioning is used to ensure that there is no obstruction presented to interfere with the user moving sideways to leave the wheelchair.

FIG. 3 illustrates the path 24 followed by the footrest 9 as it is moved between the contracted and extended positions. As the footrest 9 travels along the path 24, the distance changes between the axis 23 of the shaft 10 and the footrest 9. As a consequence the input lever 8 is made to be telescopic. Otherwise, the user's knees would be driven into his chest on the up stroke. By making the input lever 8 telescopic, the axis of the user's knees can remain stationary, which is desirable.

The extension control assembly 11 is provided to ensure that the telescoping lever 8 and footrest 9 function to bear at least part of the weight of the user's legs and the lever.

Having reference to FIGS. 1–5, the extension control assembly 11 comprises a pulley support 30 attached to the shaft 10. The pulley support 30 extends radially, rearwardly and generally horizontally from the shaft 10 when the input lever 8 is in the contracted or generally vertical position. The pulley support 30 carries a pair of pulleys 31, 32 spaced along its length. A cord 33 is attached at one end to the outer tube 17. The cord 33 extends up the input lever 8 and passes over the pulleys 31, 32. The other end of the cord 33 is secured to an anchor bar 34 which is fixed to the front end of the frame 3. Thus the length of the cord 33 remains constant and its ends are fixed to the outer tube 17 and the frame 3. As a result of this arrangement, when the leg muscles cause the input lever 8 to pivot upwardly, the pulley support 30 rotates downwardly, bringing the rear pulley 32 closer to the anchor bar 34, This permits cord 33 to reel out from the front pulley 31 to enable the outer tube 17 to move along the inner tube 16, thereby lengthening the input lever 8. The weight of the user's feet on the footrest 9 keeps the cord 33 in tension as the input lever 8 extends and pivots upwardly. When the user's leg muscles flex the knees and cause the upraised input lever 8 to pivot downwardly from the raised position, the outer end of the cord 33 is reeled in as the rear pulley 32 moves away from the anchor bar 34. The inwardly reeling cord 32 pulls the outer tube 17 along the inner tube 8 and the input lever 8 contracts accordingly.

Figure 5:
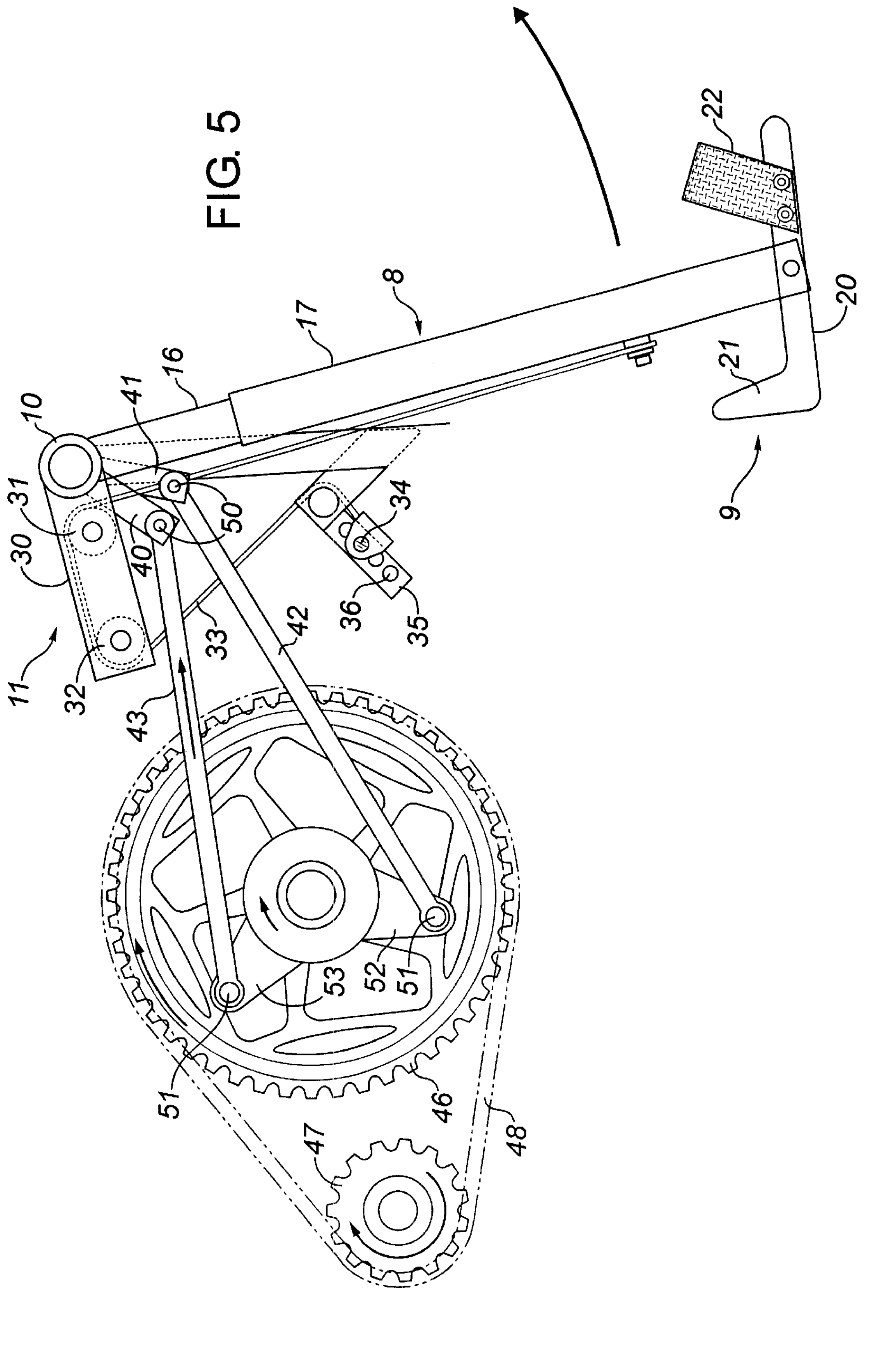
FIG. 5 is a view similar to FIG. 4 with an arrow identifying the rod which is active in the push or extension mode.
Figure 6:
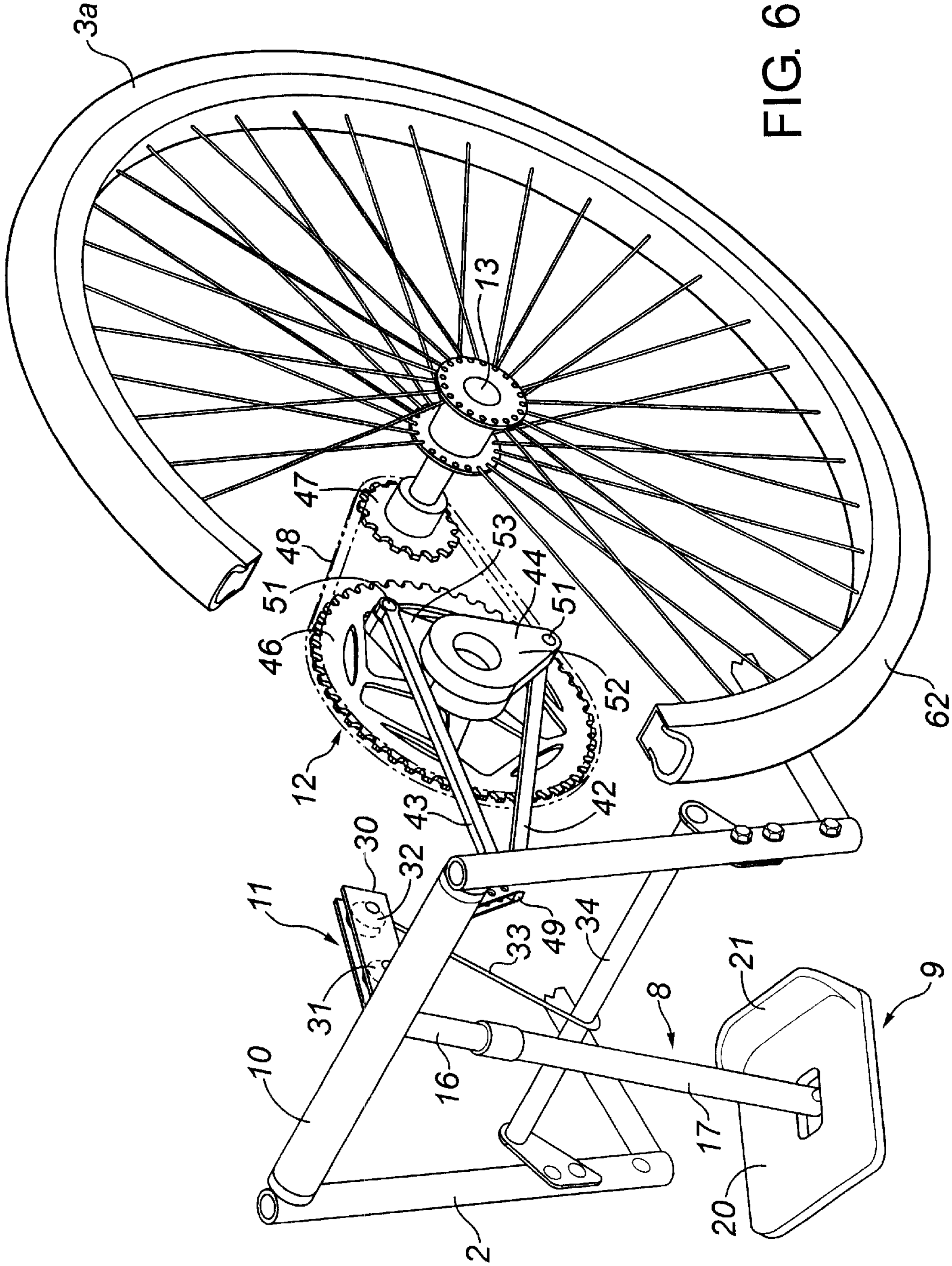
FIG. 6 is a simplified perspective view showing the input lever, frame, drive assembly and driven wheel, with the components in the contracted mode.

As shown in FIGS. 5,6 the anchor bar 34 is connected with the frame 3 by ears. Support 35 has a series of spaced apart holes 36 extending therethrough along its length. Anchor bar 34*a* extends into a selected pair of aligned holes 36. The position of the anchor bar 34*a* therefore can be adjusted by moving it from one pair of holes 36 to another. By making this adjustment, the length of the input lever 8 in the contracted state can be varied to match the length of the user's lower legs.

As a consequence of providing this construction, the axis of the user's knees (the position of which is indicated by the "+" on FIG. 3) remain stationary, while the lower legs pivot with the feet locked to the footrest 9.

As previously stated, a drive assembly 12 engages or drivably connects the input lever 8 with the driven rear wheel 3*a*. This drive assembly 12 comprises: the rotatable shaft 10; crank arms 40, 41 connected with the shaft 10; pull and push rods 43, 42 pivotally connected at their front ends with the crank arms 40, 41, respectively; a one-way pull clutch 45 connected with the rear end of the pull rod 43; a one-way push clutch 44 connected with the rear end of the push rod 42; the clutches 44, 45 being operatively connected with a large sprocket 46; the clutches 44, 45 each being adapted to engage and rotate the sprocket 46 through an angular travel when drive force is being applied by the input lever 8 to their associated rod 42 or 43; the large sprocket 46 driving a small sprocket 47 through a chain 48, whereby one rotation of the large sprocket 46 induces several rotations of the small sprocket 47, for example to provide an input/output ratio of 1:3; the small sprocket 47 being operative to engage and transmit its rotational motion to the driven rear wheel 3*a* when actuated by the drive engagement assembly 14. I refer to the assembly between the clutches 44, 45 and the driven wheel 3*a* as the transmission assembly 100. It functions to amplify the rotational speed of the input to the output and selectively transmits the output to the driven wheel.

The drive assembly 12 functions to convert the oscillating pivoting motion of the input lever 8 into forward rotational motion which is transmitted to the rear drive wheel 3*a*.

Figure 14:
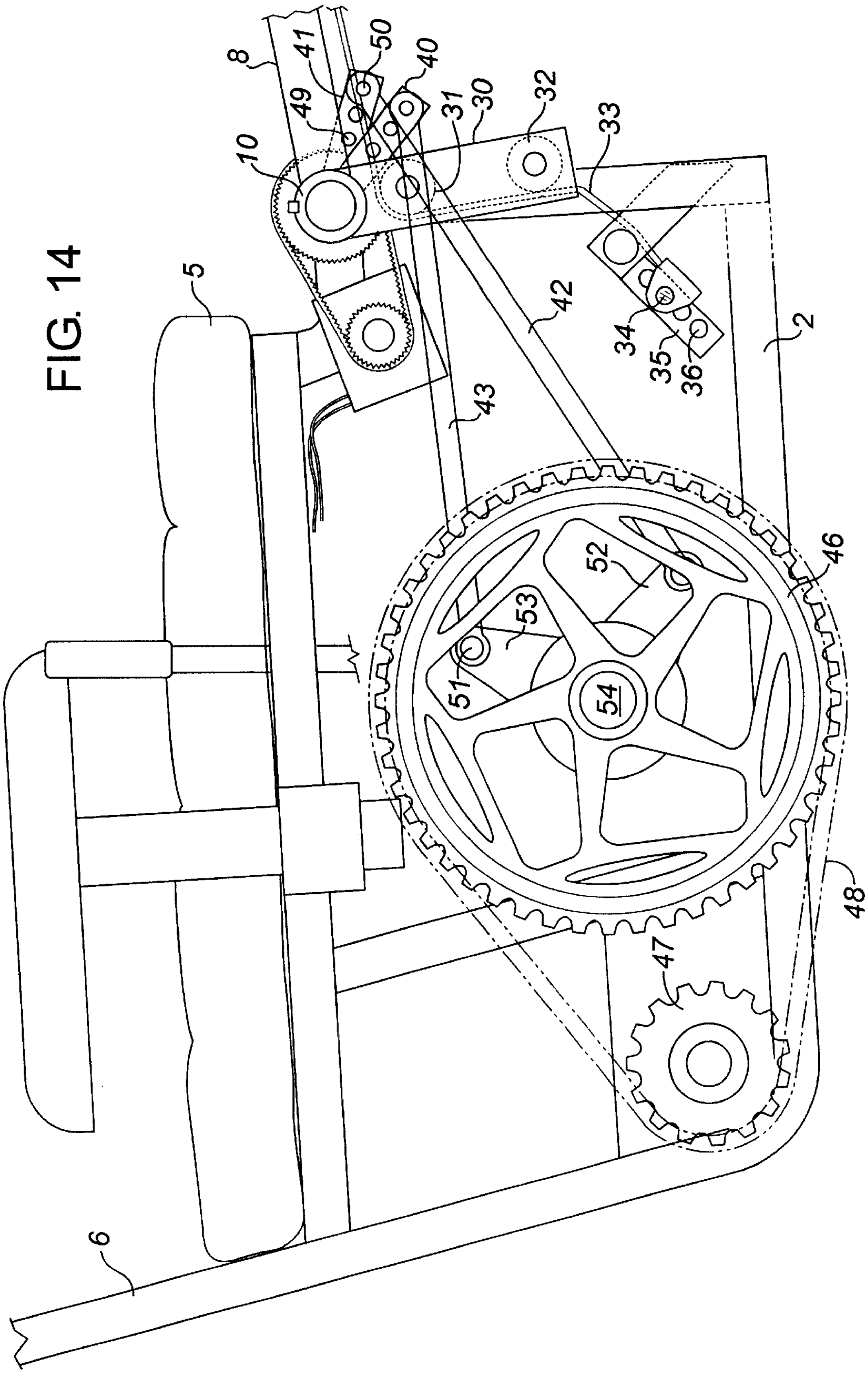
FIG. 14 is an expanded simplified elevation of part of the wheelchair with parts removed.
Figure 15:
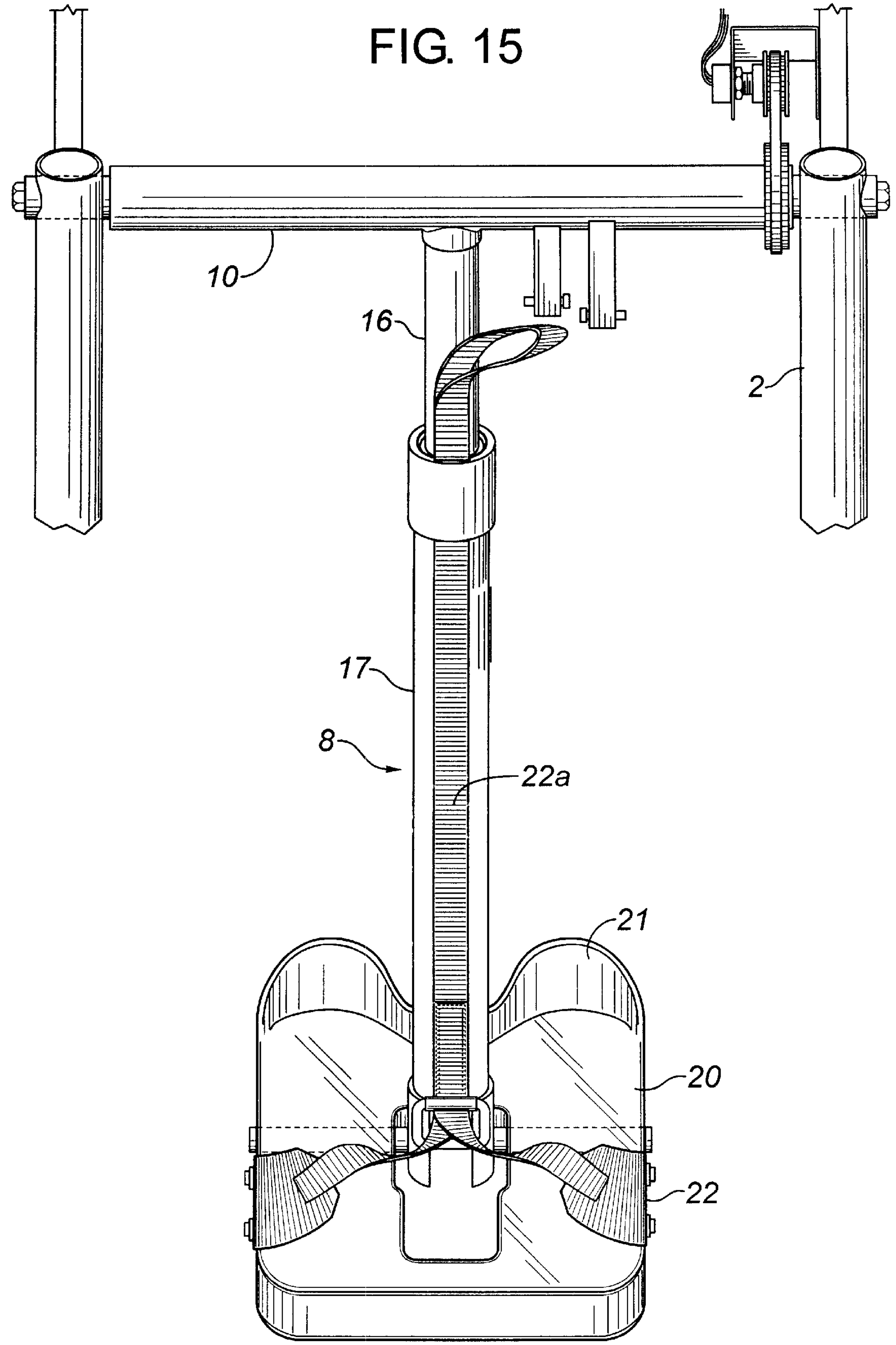
FIG. 15 is a front perspective view of the input lever.

More particularly, the pull and push crank arms 40, 41 are affixed to the shaft 10 and extend radially therefrom at different angles. As shown in FIG. 14, each of the crank arms 40, 41 forms a series of spaced apart adjustment holes 49 along its length. The forward ends of the pull and push rods 43, 42 are pivotally connected with their respective crank arms 40, 41 by pins 50 extending through holes 49. At their respective rear ends, the rods 42, 43 are pivotally connected by pins 51 with the arms 52, 53 of one-way clutches 44, 45, respectively. I use one-way clutches available, under the designation KK-30, from Morse and Sealmaster, Florence, Ky. The clutches 44, 45 are each press-fitted onto the hub 54 of a large drive sprocket 46. The hub 54 is rotatively mounted to the frame 3 by ears 54*a* and 54*b*.

Figure 4:
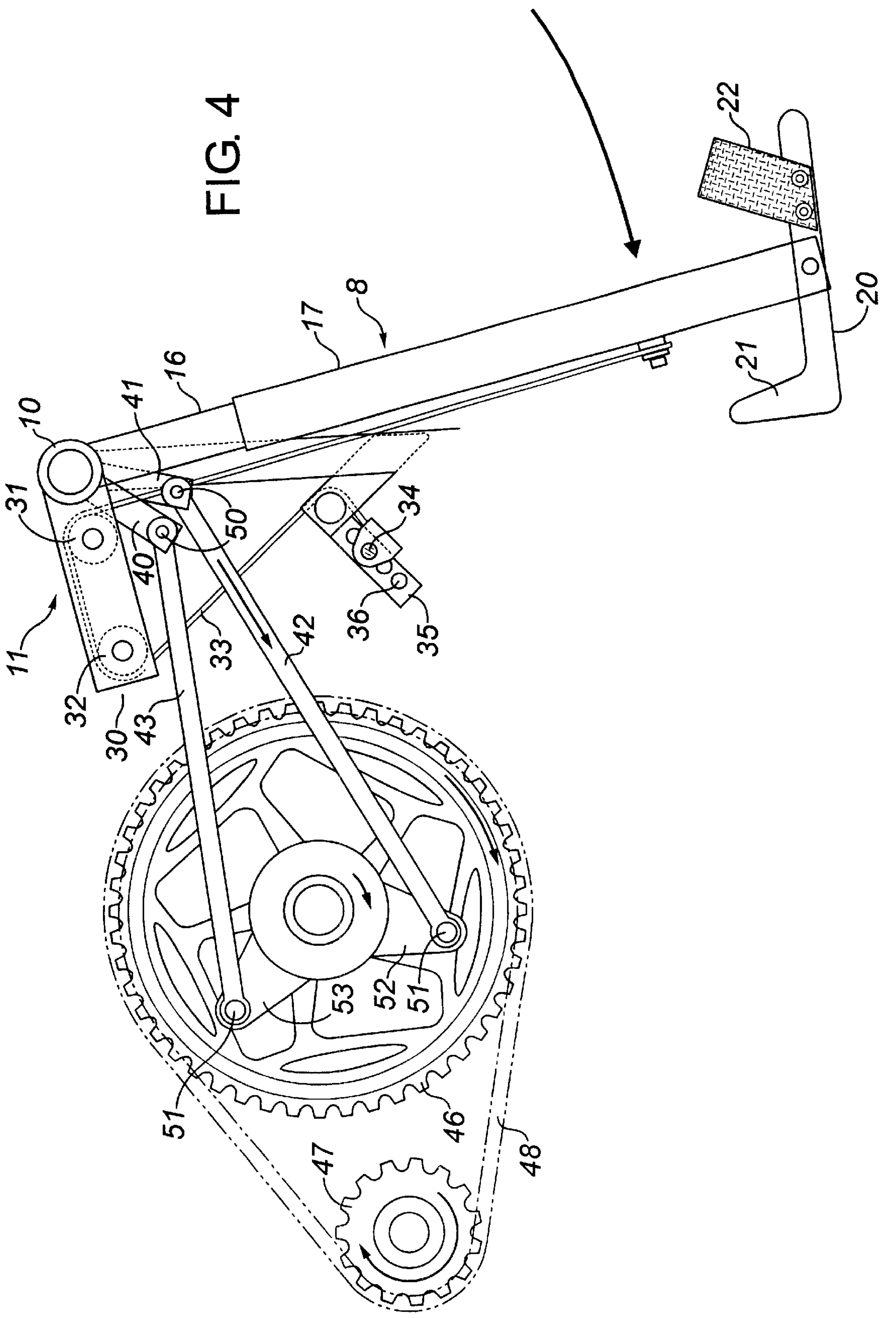
FIG. 4 is a simplified side elevation showing the input lever, extension control assembly and part of the drive assembly, with an arrow identifying the rod which is active in the pull or contraction mode.

In operation, when the input lever 8 is raised on the pivoting upstroke, as shown in FIG. 5, the pull crank 40 pulls on the pull rod 43 and rotates the arm 53 of the pull clutch 45, thereby forwardly rotating the hub 54 and drive sprocket 46 through an angular travel. These actions are indicated by the arrows on FIG. 5. When the input lever 8 is lowered on the pivoting downstroke, as shown in FIG. 4, the push crank 41 pushes on the push rod 42 and rotates the arm 52 of the push clutch 44, thereby also forwardly rotating the hub 54 and drive sprocket 46 through a further angular travel. When one clutch is so engaged, the other clutch slips.

The drive sprocket 46 is connected by a chain 48 with the small driven sprocket 47.

Figure 8:
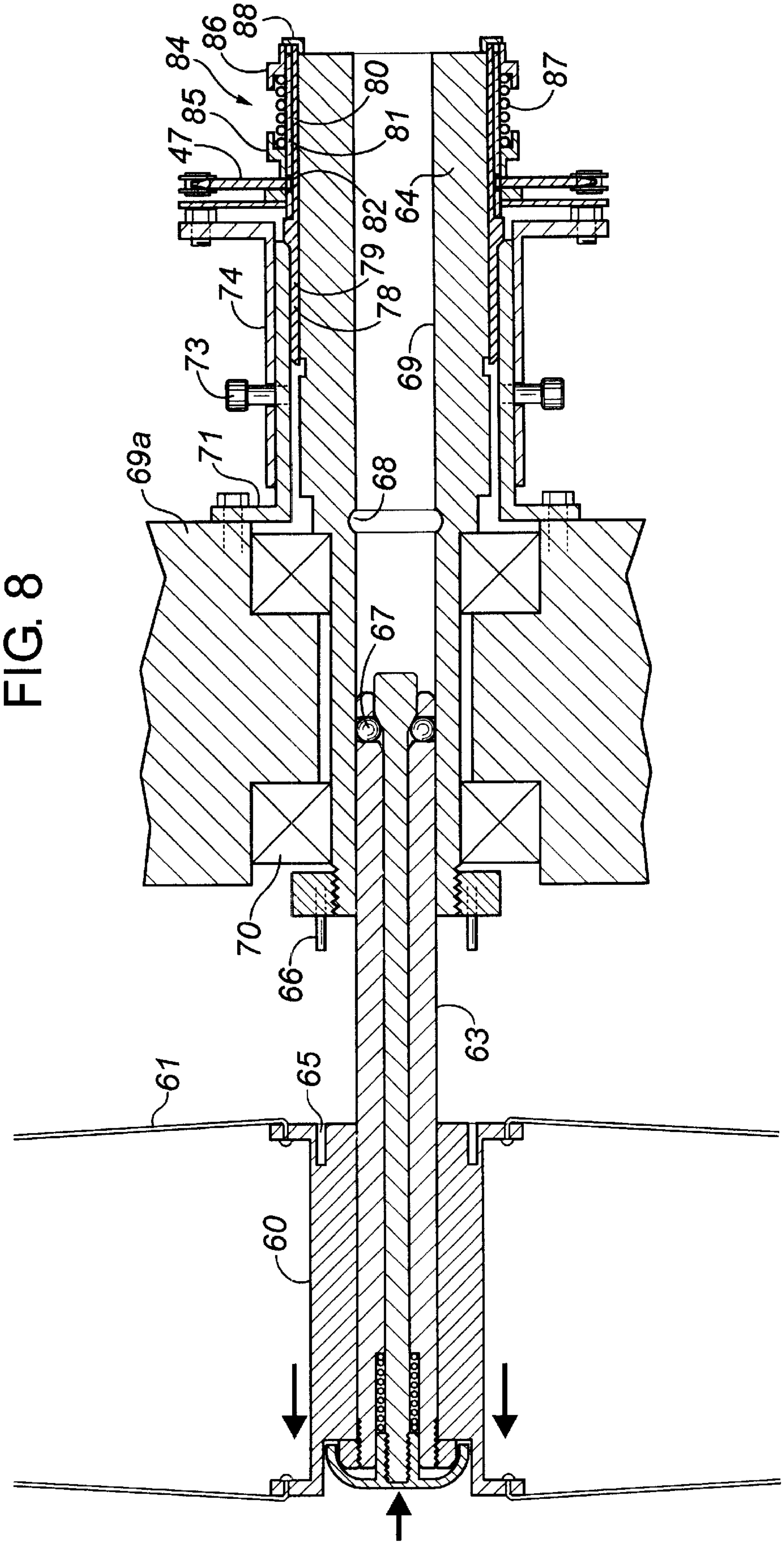
FIG. 8 is a partial side elevation, in section, showing the drive wheel and the engagement/disengagement portion of the drive assembly, in the clutch disengaged mode.
Figure 9:
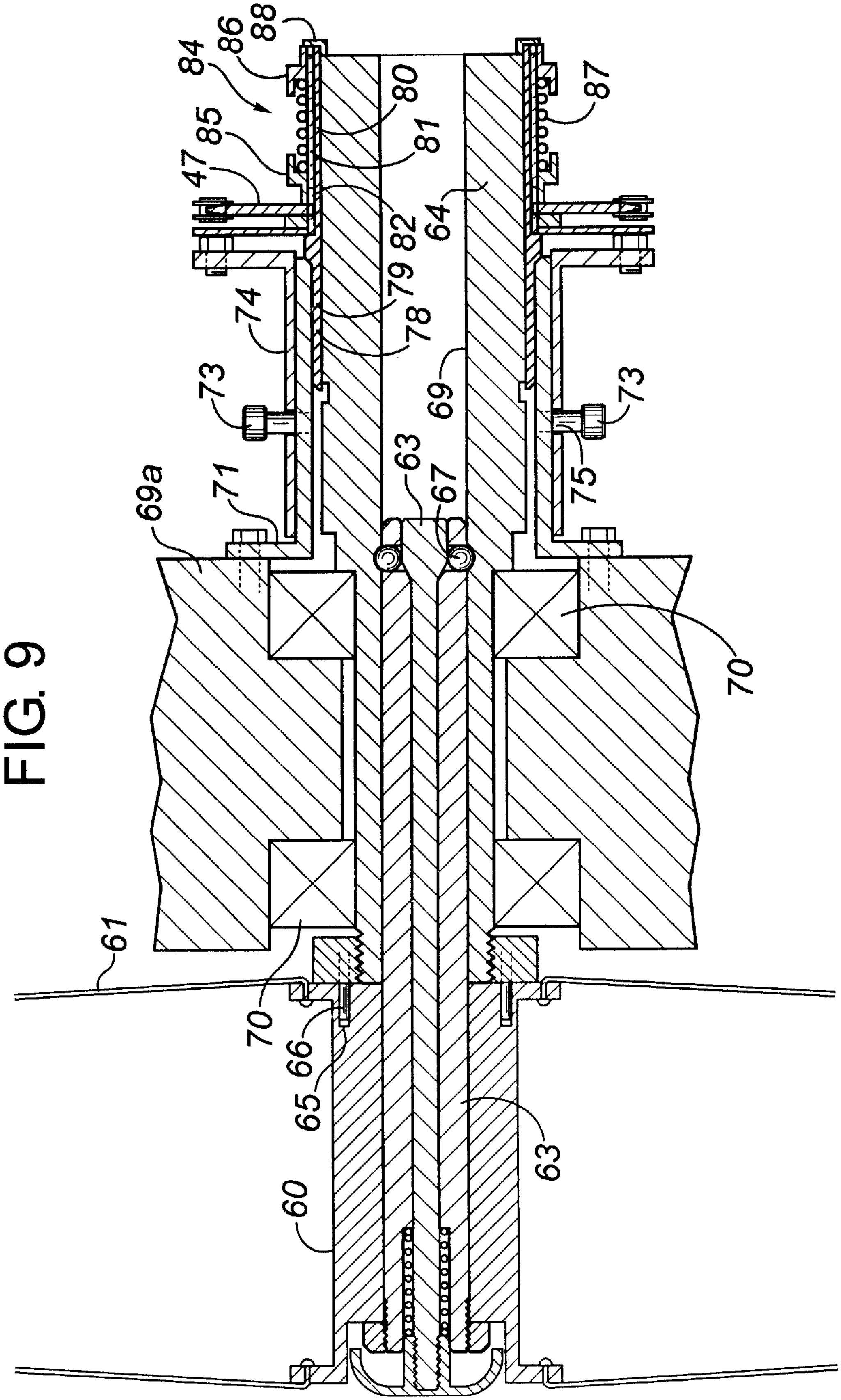
FIG. 9 is an elevation similar to FIG. 8, in the clutch engaged mode.
Figure 10:
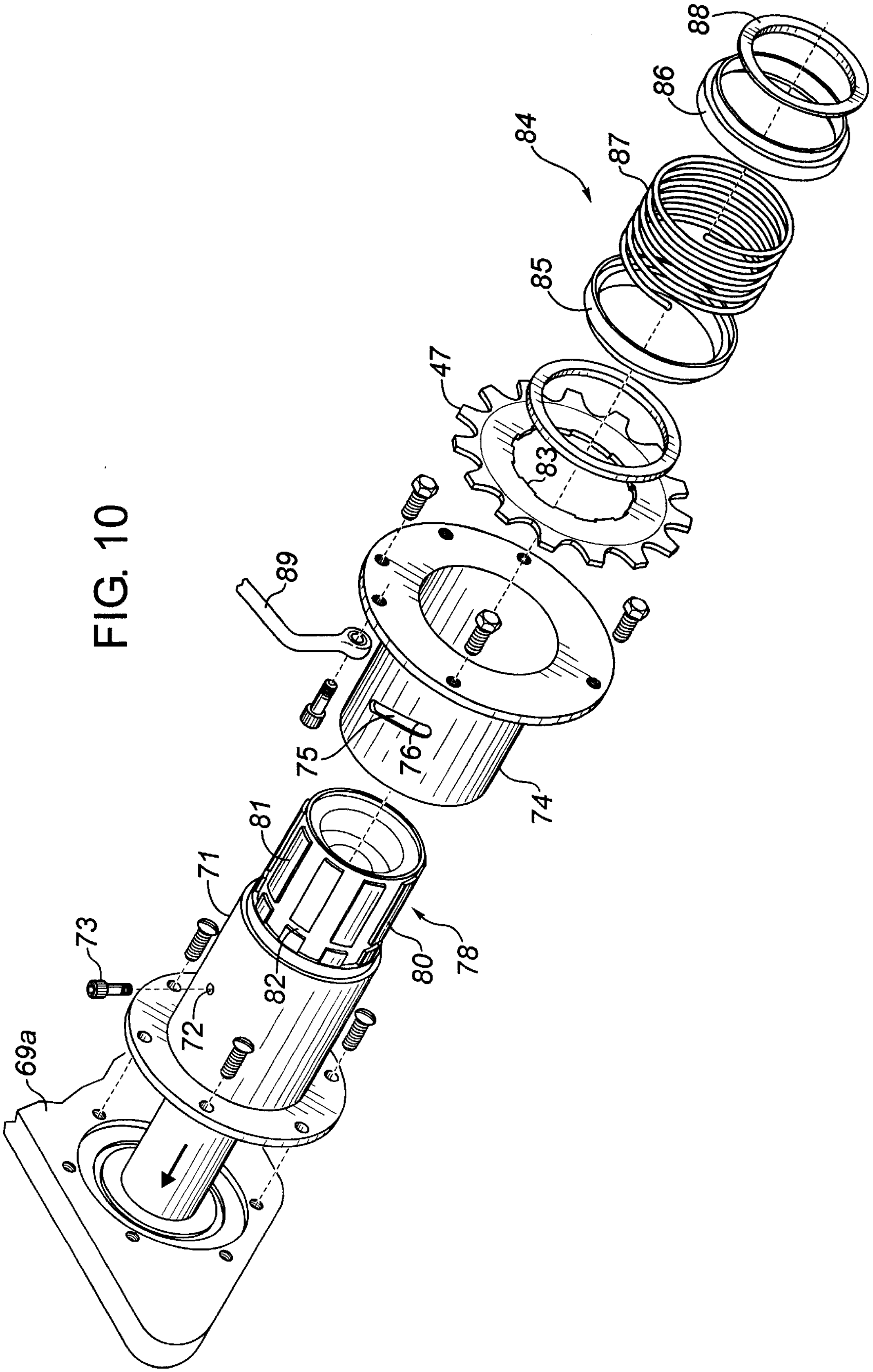
FIG. 10 is an exploded perspective view showing the engagement/disengagement portion of the drive assembly.
Figure 11:
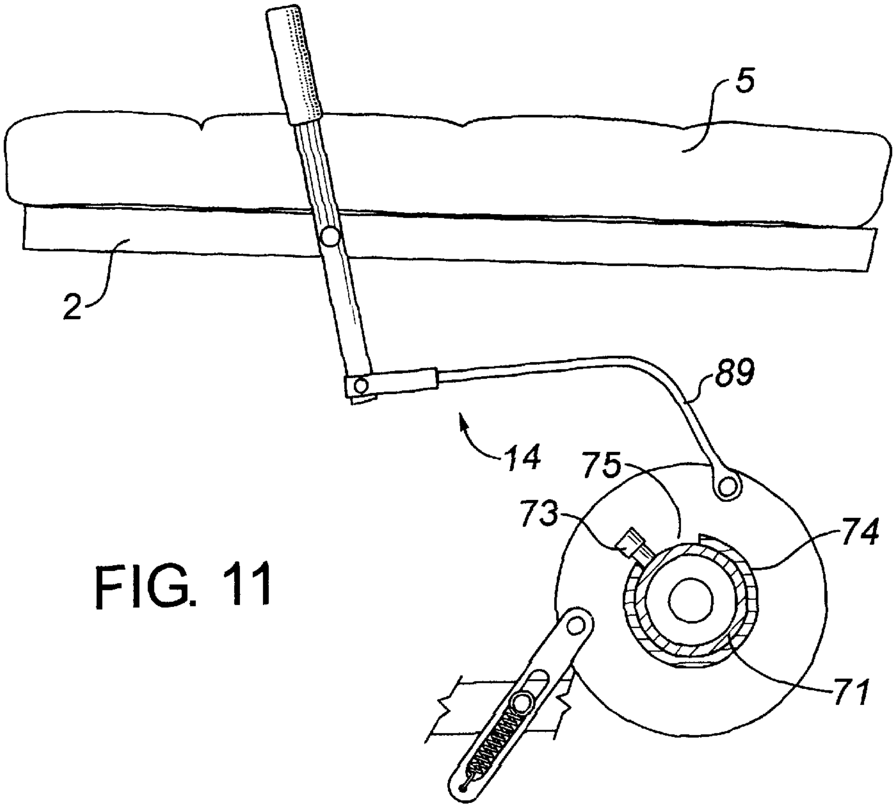
FIGS. 11 and 12 are simplified side elevations of the assembly for engaging and disengaging the drive assembly.
Figure 12:
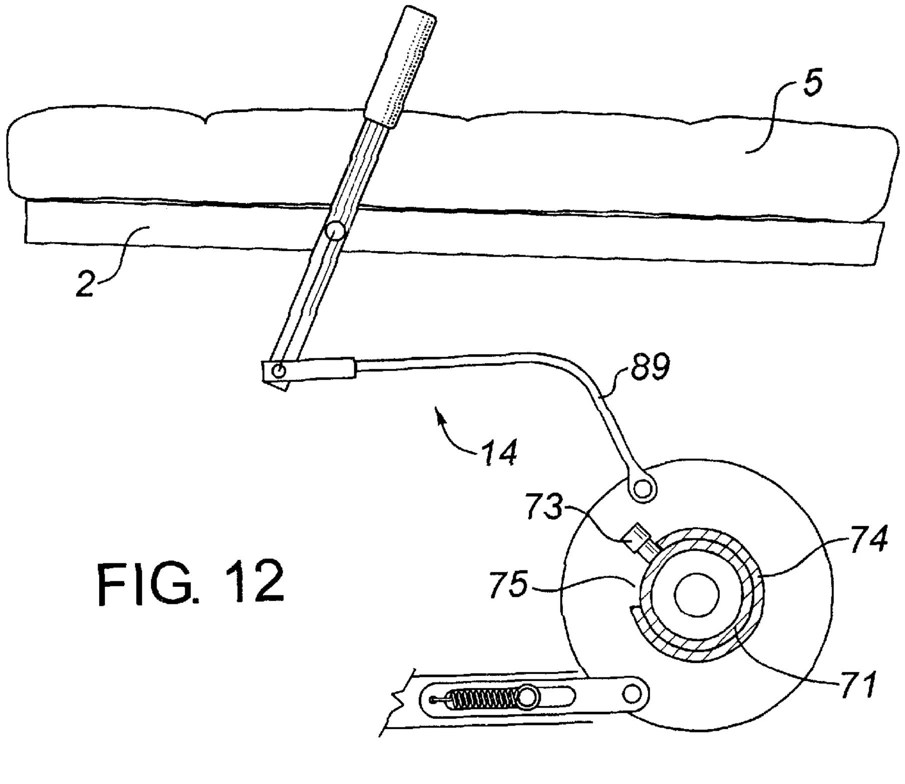

Turning now to FIGS. 8, 9 and 10, there is shown my first conceived transmission assembly 100. It comprises:

- a wheel hub 60 which supports the spokes 61 and tire 62 of the driven rear wheel 3*a;*
- an anchor shaft 63 which supports the wheel hub 60 and the tubular driven axle 64;
- the wheel hub 60 forming axial pin holes 65;
- the driven axle 64 having axial drive pins 66 received in the pin holes 65, so that the driven axle 64 and wheel hub 60 are engaged for rotation together;
- the anchor shaft 63 containing lock balls 67 which engage recesses 68 formed by the bore surface 69 of the driven axle 64, to disengagably hold the anchor shaft 63 and driven axle 64 together;
- a stationary annular bearing holder 69*a* which is bolted to the frame 2 and carries bearings 70 which support and facilitate rotation of the driven axle 64;
- a stationary bolt sleeve 71 forming a threaded hole 72 for receiving an engagement/disengagement ("E/D") bolt 73, the bolt sleeve 71 being bolted to the bearing holder 69*a;*
- a slot sleeve 74 forming a helical slot 75. The slot sleeve 74 extends around and is slideable along the bolt sleeve 71. The E/D bolt 73 extends through the slot 75 and threadably engages the hole 72 in the bolt sleeve 71. Consequently, when the slot sleeve 74 is rotated, the interaction of the E/D bolt 73 and slot wall 76 causes the slot sleeve 74 to move axially, in or out;
- the end of the driven axle 64 rotatably supporting a tubular one-way overrun clutch 78 which has a portion 79 internal of the bolt sleeve 71 and a portion 80 external of the bolt sleeve 71. The exterior portion 80 forms external splines 81 and a non-splined release groove 82. The one-way overrun clutch can drivably engage the driven axle 64, when actuated. I use an overrun clutch 78 which is a commercial product available under the designation "Roller Clutch Freehub Body" from Shimano American Corporation, Irvine, Calif.;
- the small sprocket 47, which has internal teeth 83, is mounted around the overrun clutch 78. The sprocket 47 can be shifted axially, by rotation of the slot sleeve 74, between the release groove 82 and the splines 81 of the overrun clutch 78. An assembly 84 of inner and outer rings 85, 86 and coil spring 87, mounted around the external portion 80, functions to normally urge the sprocket 47 away from the release groove 82. A lock ring 88 retains the assembly 84 on the exterior portion 80; and
- a manually operated lever 89 is connected with the slot sleeve 74, for rotating the latter to shift the sprocket 47 from the release groove 82 and into engagement with the splines 81.

When the small sprocket 47 is positioned in the release groove 82, the wheel 3*a* and driven axle 64 can freely rotate in either direction. The overrun clutch 78 is actuated by shifting the small sprocket 47 into engagement with the splines 81. When this occurs, the driven wheel 3*a* and the driven axle 64 can overrun or freely rotate forwardly, independent of the sprocket 47, until the sprocket 47 is driven at a rotational speed greater than that of the driven axle 64. At that point, the sprocket 47, the overrun clutch 78 and driven axle 64 lock up or engage together and rotate forwardly under the impetus of leg action.

Thus the user can engage the sprocket 47 and overrun clutch 78 by moving the lever 89, then rotate the wheels 3*a*, 3*b* forwardly using the push rims 7 while simultaneously pivoting the lower legs until lock up occurs, following which leg action drives the driven wheel 3*a*. To facilitate reverse movements of the push rims 7, the lever 89 is shifted, thus positioning the sprocket 47 over release groove 82, thereby enabling free rearward movement of wheel 3*a*.

Figure 16:
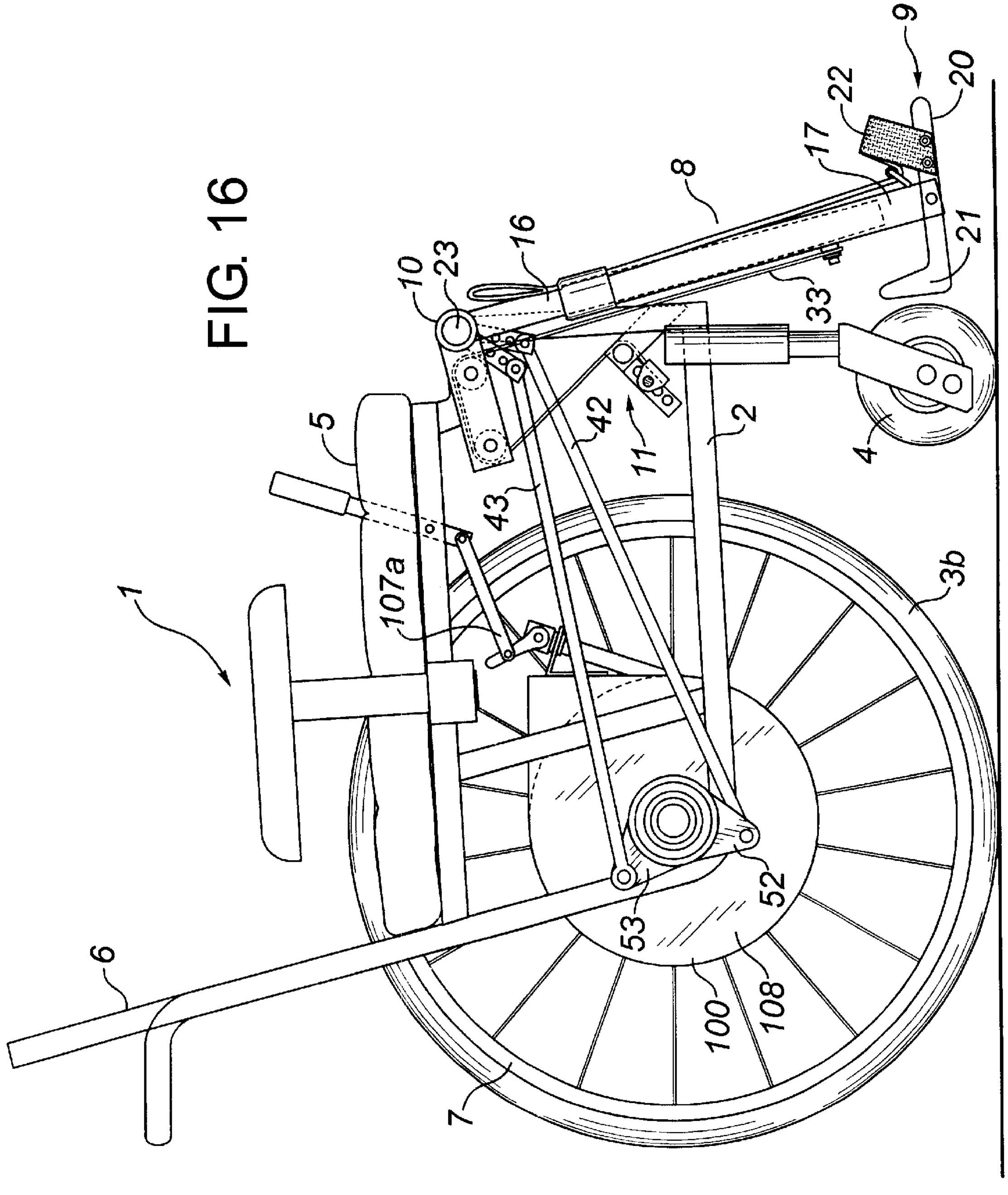
FIG. 16 is a simplified side elevation of the wheelchair showing the lever for controlling the brake band of the planetary gear assembly.
Figure 17:
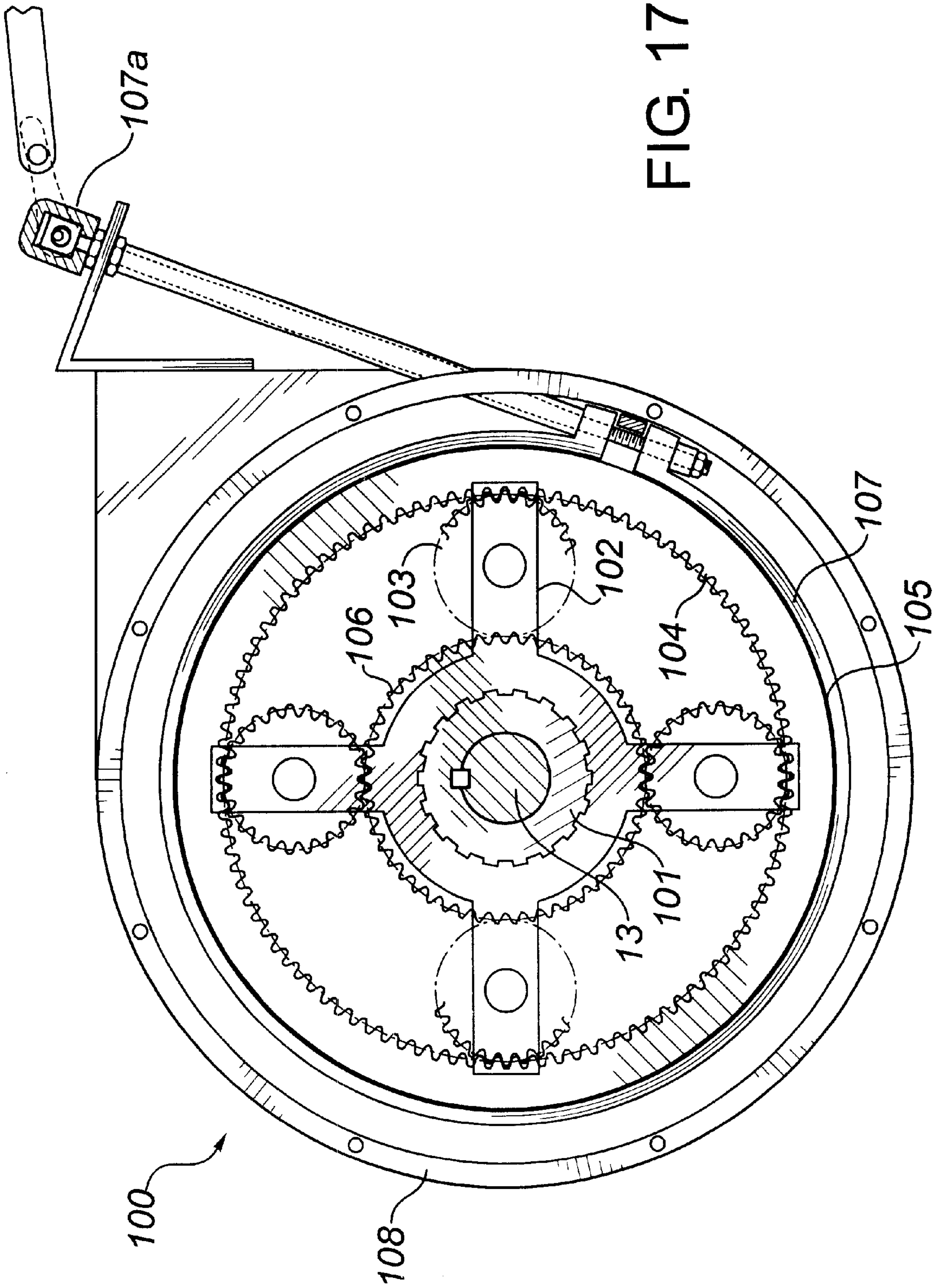
FIG. 17 is a side elevation of the planetary gear assembly.
Figure 18:
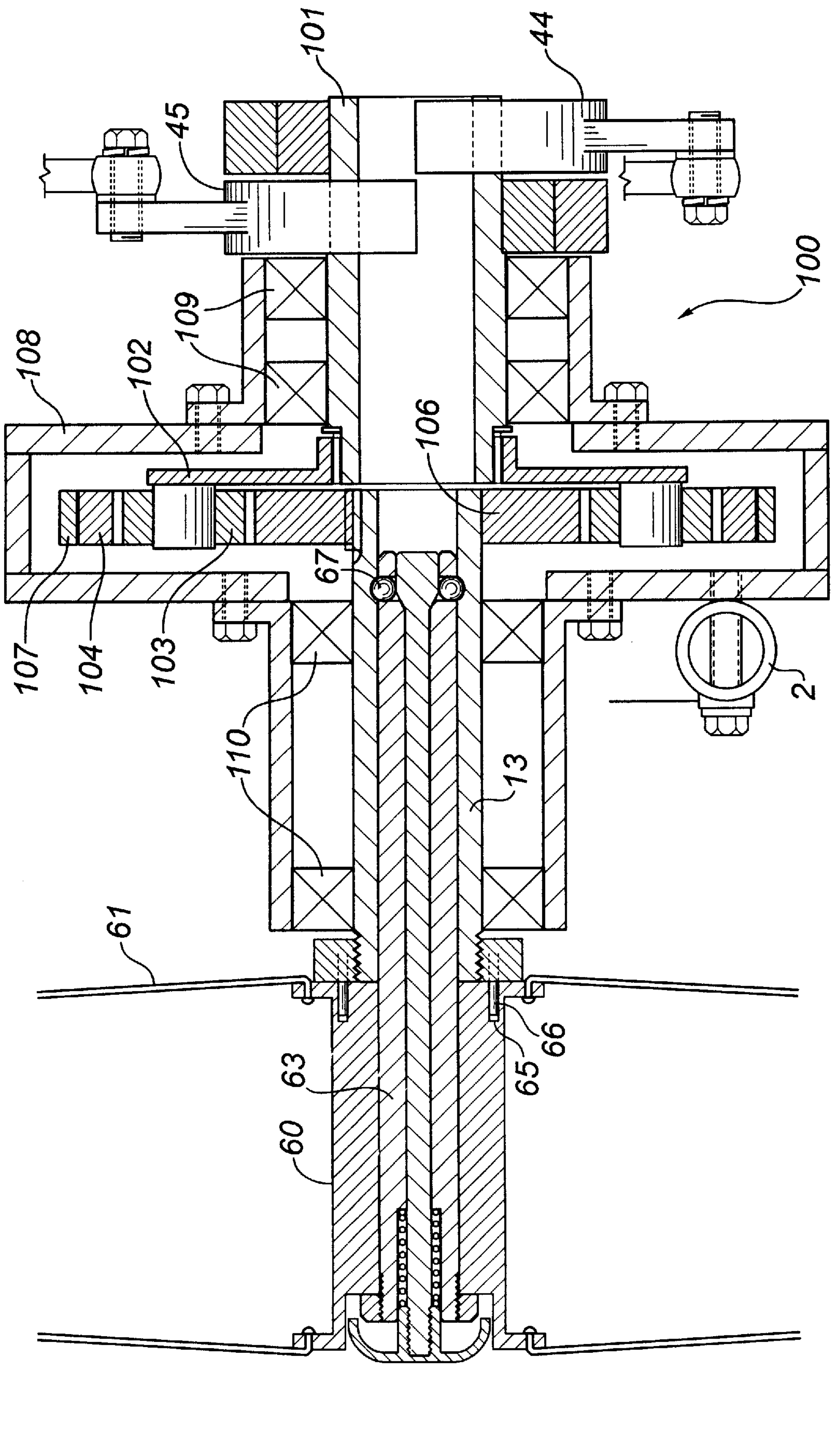
FIG. 18 is a side sectional elevation of the planetary gear assembly.

FIGS. 16–18 show an alternative later and simpler version of the transmission assembly 100. This later version utilizes a modified planetary gear assembly of otherwise conventional design. I use a planetary gear assembly available from Matex Products Corporation, Cleveland, Ohio, under designation 3MHN. More particularly, this transmission assembly 100 comprises:

- an input shaft 101 coupled to the one-way clutches 44, 45 and to a planet carrier 102 carrying rotatable planet gears 103;
- a ring gear 104 meshing internally with the planet gears 103 and having a smooth external circumferential surface 105;
- a central sun gear 106 meshing with and driven by the planet gears 103, the sun gear 106 being coupled with the driven output axle 13 driving the wheel hub 60;

a brake band 107 for disengagably and frictionally engaging the external surface 105 of the ring gear 104;

a lever and cam assembly 107*a* for controlling the brake band 107; and a housing 108 containing the gear set and supporting the input shaft 101, lever and cam assembly 107*a* and output axle 13, all with bearings 109, 110 respectively.

As a result of this construction, the brake band 107 may be clamped to immobilize the ring gear 104, thereby enabling the rotational input of the input shaft 101 to be transmitted through the gears to the output axle 13 and wheel 3*a*. In this mode (used when the lower legs are in action), the wheels 3*a*, 3*b* cannot be backed up. Alternatively, the brake band 106 may be unclamped, thereby allowing the ring gear 104 to slip and disengaging the wheel 3*a* from the input shaft 101 and placing it in a free-wheeling condition in either direction.

The embodiments of the invention in which an exclusive property or privilege is claimed are defined as follows:

1. Apparatus to be propelled by the action of the user pivoting a lower leg about the knee joint, comprising:

a frame supporting a seat having a top surface;

front and rear wheels supporting the frame and being rotatably connected therewith;

a footrest for securement to the use's foot;

a telescoping input lever having upper and lower ends, the lower end being connected with the footrest, the upper end being pivotally connected to the frame at an elevation below the top surface of the seat, whereby pivoting of the user's lower leg about the knee joint can produce an oscillating pivoting motion of the input lever; and drive assembly means, engaging the input lever with the rear wheel, for converting the oscillating pivoting motion of the input lever to forward rotation motion and transmitting the rotational motion to the wheel to drive it.

2. The wheelchair as set forth in claim 1 comprising:

means for controlling the length of the input lever to ensure that the footrest supports the lower leg;

means, controllable by the user, for selectively engaging or disengaging the drive assembly; and means, manually controllable by the user, for steering at least one front wheel.

3. A wheelchair to be propelled by the action of a user pivoting a lower leg about the knee joint, comprising:

a frame supporting a seat having a top surface for supporting a user;

a pair of rear wheels and at least one front wheel supporting the frame and being rotatably connected therewith;

a footrest for securement to the user's foot;

a telescoping input lever having upper and lower ends, the lower end being connected with the footrest, the upper end being pivotally connected to the frame at an elevation below the top surface of the seat, whereby pivoting of the user's lower leg about the knee joint can produce an oscillating pivoting motion of the input lever; and drive assembly means, engaging the input lever with the rear wheel, for converting the oscillating pivoting motion of the input lever to forward rotational motion and transmitting the rotational motion to the rear wheel to drive it.

4. The apparatus as set forth in claim 3 comprising:

means for controlling the length of the input lever to ensure that the footrest supports the lower leg.

5. The wheelchair as set forth in claim 4 comprising:

means, controllable by the user, for selectively engaging or disengaging the drive assembly.

6. The wheelchair as set forth in claim 5 comprising:

means, manually controllable by the user, for steering at least one front wheel.

* * * * *